(12) United States Patent
Gu et al.

(10) Patent No.: US 8,879,003 B1
(45) Date of Patent: Nov. 4, 2014

(54) DISTORTION/QUALITY MEASUREMENT (75) Inventors: Xiaodong Gu, Beijing (CN); Debing Liu, Beijing (CN); Zhibo Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/356,447

(22) PCT Filed: Nov. 28, 2011

(86) PCT No.: PCT/CN2011/083057
§ 371 (c)(1),
(2), (4) Date: May 6, 2014

(87) PCT Pub. No.: WO2013/078596
PCT Pub. Date: Jun. 6, 2013

(51) Int. Cl.
*H04N 17/00* (2006.01)
*H04N 5/21* (2006.01)
(52) U.S. Cl.
CPC .................................. *H04N 17/004* (2013.01)
USPC ........... 348/701; 348/607; 348/700; 348/739; 348/180; 375/240.27; 382/275
(58) Field of Classification Search
USPC ................. 348/607, 699, 700, 701, 180, 739; 375/240.26, 240.27, 240.16; 382/275
See application file for complete search history.

(56) References Cited

U.S. PATENT DOCUMENTS

| 8,259,819 | B2 * | 9/2012 | Liu et al. ................... 375/240.29 |
| 8,503,536 | B2 * | 8/2013 | Zuo et al. ................... 375/240.2 |
| 2004/0059983 | A1 | 3/2004 | Wang et al. |
| 2010/0201870 | A1 * | 8/2010 | Luessi et al. ................... 348/452 |

FOREIGN PATENT DOCUMENTS

| EP | 2112835 | 10/2009 |
| WO | WO2007118160 | 10/2007 |

OTHER PUBLICATIONS

Yang et al.: "Perceptual Temporal Quality Metric for Compressed Video" University of California, Qualcomm Inc., 6 pages, 2007.
Vidal et al.: Automatic Quality Assessment of Video Fluidity Impairments using a No-Reference Metric.: France Telecom R&D, 6 pages, 2006.
Search Report dated Sep. 13, 2012.

* cited by examiner

*Primary Examiner* — Jefferey Harold
*Assistant Examiner* — Jean W Desir
(74) *Attorney, Agent, or Firm* — Robert D. Shedd; Xiaoan Lu (57) ABSTRACT

Various implementations address distortion and quality measurements. Certain implementations relate to distortions resulting in a freeze-with-skip and/or a freeze-without-skip. In one implementation, a pause term provides an indication of distortion associated with a pause arising from not displaying one or more consecutive pictures that are not to be displayed. A motion term provides an indication of distortion associated with a related change in motion. A combined indicator is based on an addition of the pause term and the motion term. In another particular implementation, a first indicator indicates distortion across one or more types of distortive effects that results from not displaying a first set of pictures. A second indicator indicates corresponding distortion with respect to a second set of pictures. The first indicator and the second indicator are combined in a non-linear manner.

20 Claims, 5 Drawing Sheets

DISTORTION/QUALITY MEASUREMENT

This application claims the benefit, under 35 U.S.C. §365 of International Application PCT/CN2011/083057 filed Nov. 28, 2011 which was published in accordance with PCT Article 21(2) on Jun. 6, 2013 in English.

TECHNICAL FIELD

Implementations are described that relate to video. Various particular implementations relate to determining distortion and/or quality for video.

BACKGROUND

Video quality is affected by various distortions. Certain distortions include, for example, (i) compression artifacts, (ii) channel artifacts, (iii) freezing of a picture, and (iv) skipping of a picture. The impact of the distortion on the perceived video quality may vary depending on the type of distortion.

SUMMARY

According to a general aspect, information is accessed that indicates that one or more consecutive pictures from a video sequence are not to be displayed. A pause term and a motion term are determined. The pause term provides an indication of an amount of distortion associated with a pause arising from not displaying the one or more consecutive pictures that are not to be displayed. The motion term provides an indication of an amount of distortion associated with a change in motion arising from not displaying the one or more consecutive pictures that are not to be displayed. A combined indicator of an amount of distortion is determined based on an addition of the pause term and the motion term.

According to another general aspect, information is accessed indicating that a first set of one or more consecutive pictures from a video sequence are not to be displayed. Information is also accessed indicating that a second set of one or more consecutive pictures from the video sequence are not to be displayed. The second set is separated from the first set in the video sequence. A first indicator and a second indicator are determined. The first indicator indicates an amount of distortion across one or more types of distortive effects that results from displaying the video sequence without displaying the first set of pictures. The second indicator indicates an amount of distortion across the one or more types of distortive effects that results from displaying the video sequence without displaying the second set of pictures. The first indicator and the second indicator are combined in a non-linear manner to produce a combined indicator of distortion.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

As a preview of some of the features presented in this application, at least one implementation detects impairments in a video sequence caused by freezing. Such impairments are often referred to as temporal impairments. Additionally, at least one of these implementations evaluates the impairment using bit-stream layer information rather than pixel layer information. Further, the evaluation provides an estimate of the distortion caused by the impairment, and the resulting quality. One particular implementation combines, in an additive manner, distortion resulting from different types of distortive effects that are present in a given freezing event. Another implementation pools the distortion from separate freezing events in a non-linear manner. These and other implementations are described below.

Video quality can be impacted by a variety of distortions. Such distortions may include, for example, one or more of the following:

Compression artifacts, which are caused, for example, by a lossy coder-decoder ("codec").

Channel artifacts, caused by packet loss: Packet loss is detected at the transport layer and decoder error concealment post-processor tries to mitigate the effect of lost packets. Such error concealment is performed, for example, at a block level. The distortions generated in error concealment (for example, in a post-processor), and the propagation of the error concealment distortions from the current picture to pictures that are decoded after the current picture, are called channel artifacts.

Freezing with skip, also caused by packet loss: "Freezing" refers to a pause in the display of a video sequence, during which a current picture is displayed for more than a single picture display time. The difference between the distortion referred to as "freezing with skip" and the distortion referred to as a "channel artifact" is that, in certain implementations, the whole picture is dropped when a packet of the picture is lost. An additional difference in various implementations is that when an entire picture is dropped, and therefore skipped, the pictures that depend on the dropped picture as a prediction reference are also dropped. When one or more pictures are dropped, the current picture is "frozen" in the display for a time duration that corresponds to the current picture display time and the display time of the dropped pictures. A viewer that sees a "frozen" display typically perceives this as a distortion. Additionally, because the dropped pictures are not displayed at all, these dropped pictures are said to be "skipped". "Skipping" typically introduces a perceptible jump or transition that a viewer perceives as a separate distortion from the "freezing", although the two distortions are related.

Freezing without skip, caused by buffer underflow: For reasons such as, for example, network delay, there may not be a decoded picture in the buffer when a display asks for a picture to show. The display then pauses until the next decoded picture arrives in the buffer. This kind of distortion is called "freezing without skip" because no picture is skipped.

The impact of these, and other, distortions can be evaluated at both a bit-stream layer and a pixel layer. In various bit-stream layer methods, the evaluation scheme is based on the parser of the bit-stream and the pixel value is not decoded. In various pixel layer methods, full decoding of the bit-stream is acceptable. Clearly, at the pixel layer, additional information is available for evaluating the distortion. However, additional computation, and time, are typically required to get the pixel layer information.

Accordingly, at least one implementation in this application provides a technique for evaluating quality at a bit-stream layer when video is distorted by one or more "freezing" (with or without skip) distortions. Further, one or more implementations detect an occurrence of one or more "freezing" distortions, and provide a measure of the resulting distortion and quality of the video. Note that a "freezing" distortion may also, or alternatively, typically be considered to be two or more distortions. The first occurrence of distortion is typically a jerk (or a stop) in the motion when the "freezing" begins. The second occurrence of distortion is typically the pause created by the "freezing". A third occurrence of distortion, for "freezing with skip", is typically the "skip", that is, the jump in the motion that occurs after the "freeze" ends.

Various implementations determine the impact on a viewer of, for example, a given "freezing" event (or of a component of the event, such as the "freeze" or the "skip"), or of multiple "freezing" events (or components from multiple events). The impact is often described as a numerical value, and is typically referred to as "distortion" (or as "quality"). The determined distortion, however, in various implementations is not complete. That is, in various implementations, the determined distortion ignores a component, or an event, and is best considered to be an approximation or an estimate.

1. Discussion of Distortion

When packet loss is detected at a transport layer, practical decoding systems typically have two choices. A first choice is to try to mitigate the effect of one or more lost packets with error concealment, performed, for example, at an error concealment post-processor. The error concealment process may perform any of a variety of error concealment techniques, which are known in the art, including, for example, copying a corresponding block from another picture. A second choice is to drop the whole picture. Channel artifacts are often generated when error concealment is selected. "Freezing with skip" effects are often generated when a picture is dropped.

One or more implementations that focus, at least in part, on "freezing with skip" effects are discussed in this application. In at least one implementation, when a packet loss occurs the whole picture is dropped, resulting in a "freezing with skip" distortion. If the dropped picture is an I-picture or a P-picture, then the dropped picture is used as a prediction reference picture for one or more additional pictures that have not yet been decoded. These additional pictures may be said to be dependent on the dropped picture, and can be referred to as dependent pictures. These dependent pictures are also dropped in at least one implementation. More specifically, for this implementation:

If a packet in an I-picture is lost, then all the pictures in a group-of-pictures ("GOP") are dropped. This is because, a typical GOP includes an I-picture which will be dropped because of the lost packet, and all the remaining pictures in the GOP depend from the I-picture either directly or indirectly.

If a packet in a P-picture is lost, the P-picture is dropped. Additionally, all pictures in the GOP that depend from the dropped P-picture are dropped. In many cases, this will correspond to the P-picture and all remaining pictures to the end of the GOP.

If a packet in a normal B-picture is lost, then only the B-picture (which contains the lost packet) is dropped. Note that normal B-pictures are not used as a reference for any other pictures.

In the above scenarios, at least one group of continuous pictures are dropped when a packet loss occurs. A group includes one or more pictures. This occurs regardless of whether the picture that contains the lost packet is an I-picture, a P-picture, or a B-picture.

Figure 1:
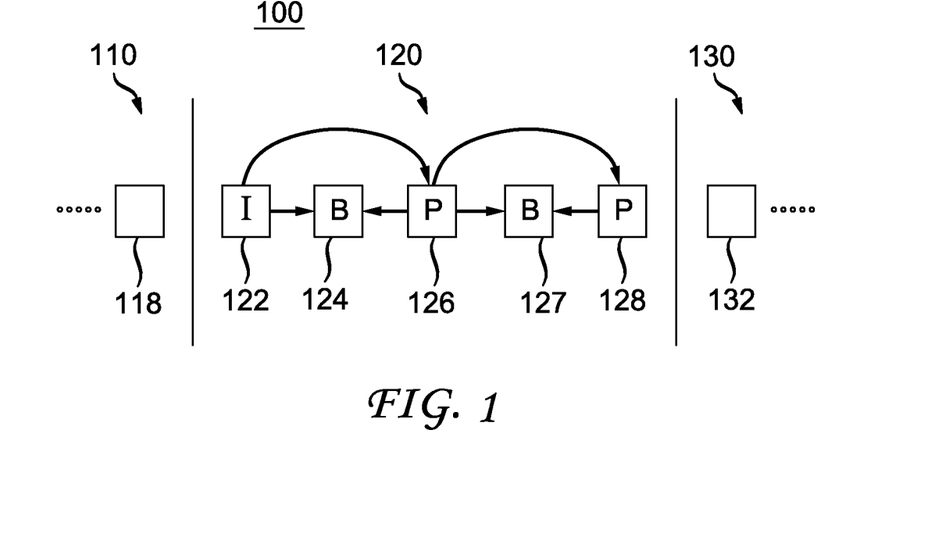
FIG. 1 is a pictorial representation of a first example of a sequence of pictures.
Figure 2:
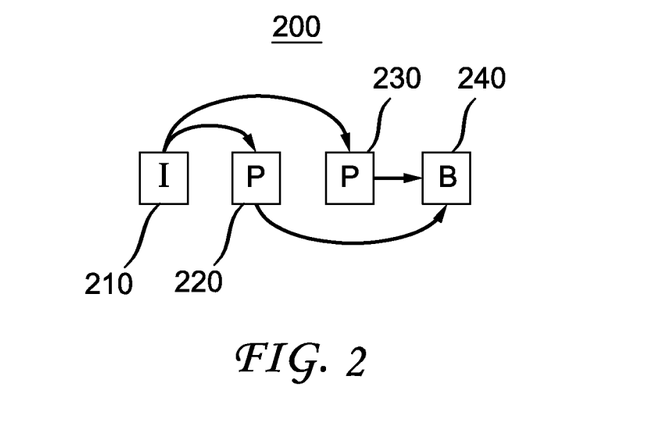
FIG. 2 is a pictorial representation of a second example of a sequence of pictures.

FIGS. 1 and 2 provide examples. Referring to FIG. 1, a sequence 100 of video pictures is shown in display order from left to right. The sequence 100 includes multiple sequential GOPs, including a GOP 110, a GOP 120, and a GOP 130. For the GOP 110, only the last picture is shown, which is a picture 118. Similarly, for the GOP 130, only the first picture is shown, which is a picture 132. However, for the GOP 120, all of the pictures in the GOP 120 are shown.

The GOP 120 includes an I-picture 122, a B-picture 124, a P-picture 126, a second B-picture 127, and a second P-picture 128. The I-picture 122 has no reference picture. The B-picture 124 depends from the I-picture 122 and the P-picture 126, as shown by the arrows going from the I-picture 122 and the P-picture 126 to the B-picture 124. The P-picture 126 depends from the I-picture 122, as shown by the arrow going from the I-picture 122 to the P-picture 126. The B-picture 127 depends from the P-picture 126 and the P-picture 128, as shown by the arrows going from the P-picture 126 and the P-picture 128 to the B-picture 127. The P-picture 128 depends from the P-picture 126, as shown by the arrow going from the P-picture 126 to the P-picture 128.

It can be seen that if one or more of the pictures in the GOP 120 is dropped, then there will be one or more consecutive group droppings, as follows. A consecutive group dropping is a set of one or more consecutive pictures that are dropped.

If the I-picture 122 is dropped, then all of the pictures in the GOP 120 will be dropped because all remaining pictures in the GOP 120 depend from the I-picture 122. This will be one consecutive group dropping that includes five pictures.

If the B-picture 124 is dropped, then only the B-picture 124 is dropped because no other picture depends from the B-picture 124. This will be one consecutive group dropping that includes only one picture.

If the P-picture 126 is dropped, then all pictures except the I-picture 122 will be dropped because all of those pictures depend from the P-picture 126. This will be one consecutive group dropping that includes four pictures.

If the B-picture 127 is dropped, then only the B-picture 127 is dropped because no other picture depends from the B-picture 127. This will be one consecutive group dropping that includes only one picture.

If the P-picture 128 is dropped, then B-picture 127 will also be dropped because the B-picture 127 depends from the P-picture 128. This will be one consecutive group dropping that includes two pictures.

Referring to FIG. 2, another example is provided. FIG. 2 shows a GOP 200 that includes an I-picture 210, a first P-picture 220, a second P-picture 230, and a B-picture 240. The I-picture 210 has no reference picture. The P-picture 220 depends from the I picture 210, as shown by the arrow going from the I-picture 210 to the P-picture 220. The P-picture 230 also depends from the I picture 210, as shown by the arrow going from the I-picture 210 to the P-picture 230. The B-picture 240 depends from the P-picture 220 and the P-picture 230, as shown by the arrows going from the P-picture 220 and the P-picture 230 to the B-picture 240.

It can be seen that if one or more of the pictures in the GOP 200 is dropped, then there will be one or more consecutive group droppings, as follows.

- If the I-picture 210 is dropped, then all of the pictures in the GOP 200 will be dropped because all remaining pictures in the GOP 200 depend from the I-picture 210. This will be one consecutive group dropping that includes four pictures.
- If the P-picture 220 is dropped, then the B-picture 240 will also be dropped because the B-picture 240 depends from the P-picture 220. However, the P-picture 220 and the B-picture 240 are not adjacent. Thus, this will result in two consecutive group droppings, each of which includes only one picture. The first group dropping includes the P-picture 220. The second group dropping includes the B-picture 240.
- If the P-picture 230 is dropped, then the B-picture 240 will also be dropped because the B-picture 240 depends from the P-picture 230. This will be one consecutive group dropping that includes two pictures.
- If the B-picture 240 is dropped, then only the B-picture 240 is dropped because no other picture depends from the B-picture 240. This will be one consecutive group dropping that includes only one picture.

We can therefore conclude that, in the scenario of "freezing with skip" a distorted video sequence contains at least one group dropping. In at least one typical "freezing with skip" implementation, every group dropping includes one or more continuous (adjacent) pictures that are dropped and replaced by the last correctly received picture in the display sequence. As a result, the viewer will typically recognize that the video freezes for some time, while the last correctly received picture remains in the display during the picture time(s) corresponding to the group dropping, and that the video recovers afterward. The total display time for the distorted video sequence is not changed, as compared with the total display time for the original (un-distorted) video sequence.

The algorithm below provides at least one implementation and solution for evaluating the impact of the "freezing" (with or without "skip") distortion. In one particular implementation, the algorithm below evaluates the overall degradation caused by "freezing with skip", and the overall quality of the distorted video.

2. An Implementation for Evaluating Distortion/Quality

In this section, we propose implementations that provide, for example, a video quality evaluation model for "freezing", with or without skip, in a certain window size. As an example of a window size, P.NBAMS is a standards organization that is addressing "Non-intrusive bitstream model for the assessment of performance of video streaming" (in particular, with respect to Study Group 12 Question 14 (SG12/Q14)), and the related standard requires a window size of ten seconds. The model is applied, in various implementations, to a variety of different windows. For example, the model is applied in particular implementations to isolated and disjoint windows of interest, to consecutive windows throughout the video, or to overlapping windows to allow complete granularity in specifying any and all windows of interest.

In typical applications, the window size is chosen as part of a model of the human memory, which models the observed tendency of the human brain to forget things after a period of time. Accordingly, many implementations do not use pooling strategies across larger windows or across multiple windows. Nonetheless, in certain applications, for video longer than the window size, pooling strategies are applied to get the final result. Several implementations extend one or more of the pooling solutions described below, which is described in connection with a window, to multiple windows or to an extended window size. However, another implementation attenuates the contribution from more remote distortion events.

Before entering into the discussion below, we summarize some aspects of the context for at least one implementation described below. In the discussion below, a short video (for example, 10 seconds) is degraded by, for example, one or more occurrences of "freezing with skip". For the "freezing with skip" implementations, there are one or more group droppings in the video. For each group dropping, one or more continuous pictures are dropped and replaced with the last correctly received picture. The evaluation model described below is applied, in certain implementations, at a receiver or decoder that has information available about lost packets and dropped pictures. However, various other implementations use the model, or variations of the model, at other points in a typical communications system, as is described later in this application.

2.1 Distortion/Quality Evaluation of a Group Dropping

The distortion created by a group dropping is typically influenced by at least two features, which are (i) the length of the group dropping, and (ii) the movement at the dropping location. The longer the length of the dropping, or the stronger the movement at the dropping location, the higher the distortion for typical applications.

The inventors have determined, however, that for at least particular implementations these two features operate essentially independently of one another. The inventors have further determined that, for at least particular implementations, the two features operate essentially in an additive manner. Certainly implementations can be described that combine these features in, for example, a multiplicative manner, or in an exponential manner. However, an additive combination has been followed in at least one implementation.

The additive combination also provides a meaningful correspondence with the observation that the "freeze" and "skip" distortions, from a viewer's perspective, occur at different points in time. The inventors have determined that, for at least particular implementations, these features are separable in time, and can be modeled in a distortion evaluation as separable features. The additive combination provides this separation. The additive combination also removes from the distortion evaluation the mutual influence between these features that might otherwise exist in other combinations of these features.

In accord with the above reasoning and discussion, we define the distortion generated by a group dropping as:

$$Q(g)=f(len,c+1.5)-mv \times c$$

$$D(g)=5-Q(g) \qquad (1)$$

In the above equation:

g denotes a group dropping.

D(g) denotes the distortion generated by g.

Q(g) denotes the quality level of the video when distorted by a group dropping.

That is, the quality level of the video when the group dropping is taken into consideration. Q(g) does not factor in any other group dropping, however.

len is the length of the group dropping, expressed in this implementation as the time period of the group dropping, in seconds or some other unit of time, where the time period is the length of time that the dropped pictures would have been displayed.

mv is the movement (motion vector) at the group dropping location which, in this implementation, is normalized to the range of [0, 1]. The movement at the group dropping location, mv, is defined in this implementation as the normalized average motion vector of the last correctly received picture before the group dropping. The normalization results in mv values in the range of [0, 1]. In one implementation, normalization is based on the fact that mv will normally not be larger than 32. Accordingly, in that implementation, normalization is achieved by dividing mv by 64, and if the result is larger than 1 then the normalized mv is set to 1.

c is a constant number between [0, 4] that represents the weight between the influence of the dropping length and the influence of the movement at the dropping location. If c=0, then the influence of the movement at the dropping location is ignored. In contrast, if c=4, then the influence of the dropping length is ignored.

$f(x, min, max)$ is a monotone mapping function that satisfies the following:

$f(0,min,max)=max$ $f(+\infty,min,max)=min$

In at least one implementation, we choose:

$$f(x, min, max) = \frac{1}{x+1} \times max + \frac{x}{x+1} \times min \quad (2)$$

In equation (1), the quality level of the video when distorted by a group dropping is influenced by the two previously discussed factors of (i) the length of the dropping, len, and (ii) the movement at the dropping, mv. When both len and mv are at the lowest level (len=0, mv=0), then the quality Q is at the highest level, which is Q=5. When both len and mv are at the highest level (len=+∞, mv=1), then the quality Q is at the lowest level (Q=1).

Figure 3:
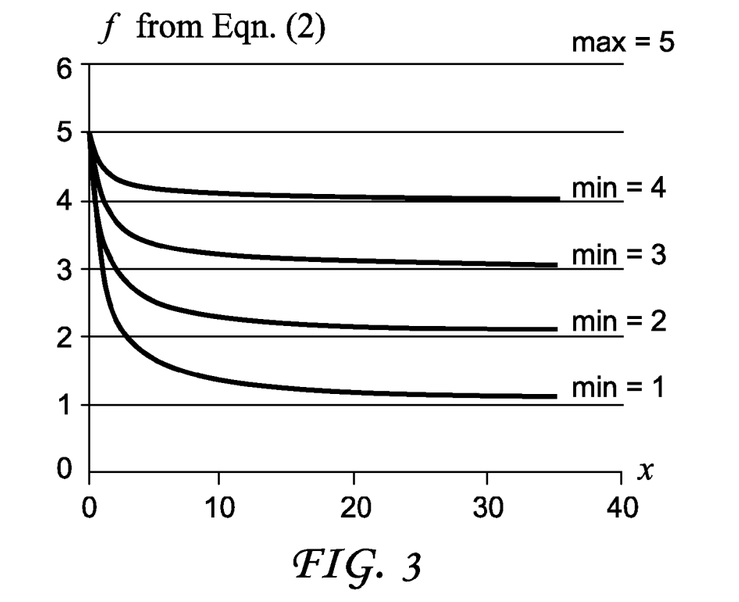
FIG. 3 is a graphical representation of various examples of a first function indicating quality of a group dropping.

Referring to FIG. 3, a set of curves is provided that show values of equation (2) for different values of max, min, and x. The x-axis shows the variable x, and the y-axis shows the value of $f$. There are four curves shown in FIG. 3. The top curve is for max=5 and min=4. The next curve down is for max=5 and min=3. The next curve down is for max=5 and min=2. The bottom curve is for max=5 and min=3. All four curves begin at a quality of max, and asymptotically approach a quality of min.

The shape of all four curves of FIG. 3 shows that the quality of a group dropping decreases as the length of the dropping increases. This characteristic reflects the observation that longer freezes are typically perceived as more of a distortion than shorter freezes. The shape of all four curves also shows that the incremental degradation of quality decreases as the length increases. This latter characteristic reflects the observation that a viewer typically becomes accustomed to the "freeze" to some extent (and to varying extents for different viewers and for different content), and that the biggest degradation to a viewer's perceived quality occurs with the initial freezing of the display.

Combining equation (1) and equation (2), we get the final distortion/quality evaluation of a group dropping, which is:

$$Q(g) = \frac{1}{len+1} \times 5 + \frac{len}{len+1} \times (c+1) - mv + c \quad (3)$$

$$D(g) = 5 - Q(g)$$

Figure 4:
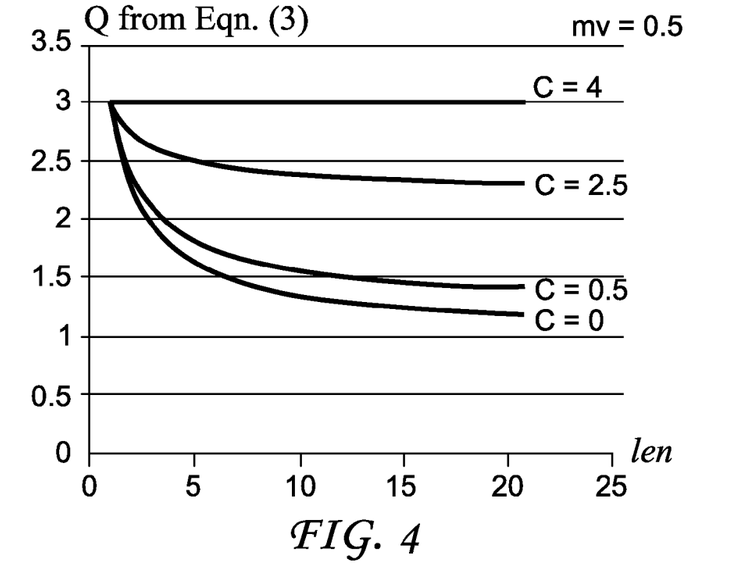
FIG. 4 is a graphical representation of various examples of a second function indicating quality of a group dropping.
Figure 5:
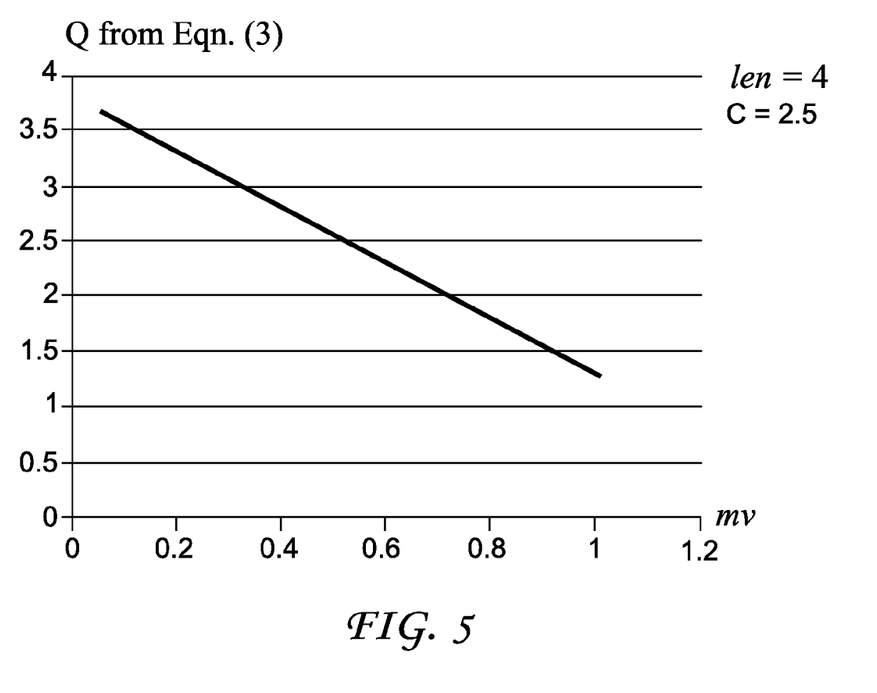
FIG. 5 is a graphical representation of another example of the second function indicating quality of a group dropping.
Figure 6:
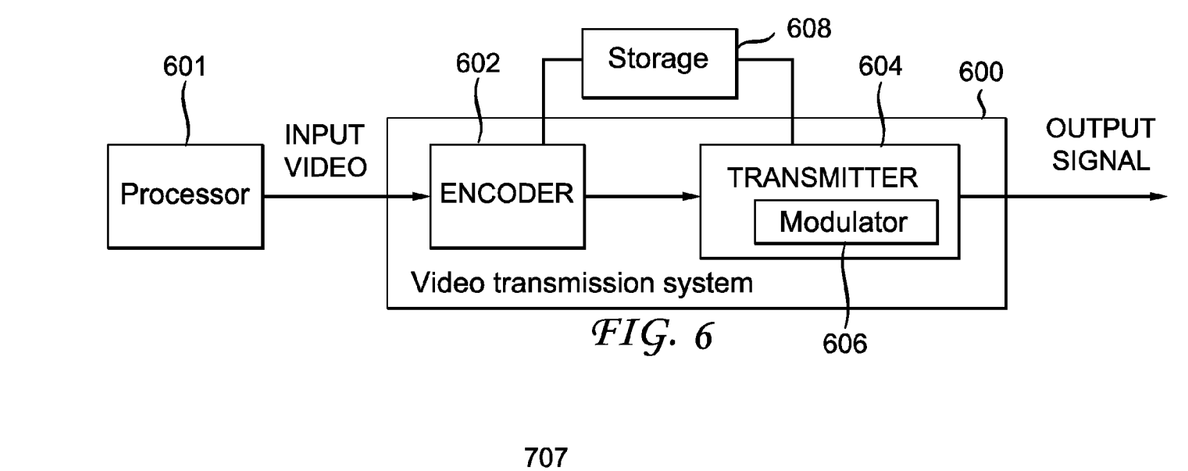
FIG. 6 is a block/flow diagram depicting an implementation of a transmission system and process that may be used with one or more implementations.

FIGS. 4-6 provide additional information and detail for equation (3).

Referring to FIG. 4, a set of curves is provided that show values of Q(g) in equation (3) for different values of c. The x-axis shows the variable len, and the y-axis shows the value of Q(g). There are four curves shown in FIG. 4. The value of mv is constant at 0.5 for all four curves. The top curve is for c=4. The next curve down is for c=2.5. The next curve down is for c=0.5. The bottom curve is for c=0.

The shape of all four curves of FIG. 4 shows that the quality of a group dropping decreases as the length of the dropping increases, unless c=4, in which case there is no weight given to the length of the dropping. This characteristic reflects the observation that longer freezes are typically perceived as more of a distortion than shorter freezes. The juxtaposition of the four curves shows that the quality of a dropping having a given length is lower if c is lower. This follows from the fact that more weight is being given to the length of the dropping as c decreases.

Referring to FIG. 5, a single curve is provided that shows the change in quality of a group dropping when mv changes. The x-axis shows the variable mv. The y-axis shows the value of Q(g). The value of len=4, and the value of c=2.5. The curve of FIG. 5 reflects the fact that the quality of a group dropping decreases linearly with increasing motion.

2.2 Pooling Strategies

Equation (3) gives the distortion and quality evaluations of a group dropping. In a typical video sequence, however, there is frequently more than one group dropping. Below we provide a strategy and implementation for determining how all of the group droppings influence each other and providing an overall distortion and/or quality level. We refer to this as pooling the effects of the group droppings. The approach below is applied, for example and in varying implementations, to the group droppings in a window, to the group droppings in a sequence, and/or to the group droppings in an entire video.

We address the distortion part of equation (3), and refer to a pooled distortion as pooling(•). The pooling strategy pooling(•) of at least one implementation satisfies the following two constraints:

1. Monotone—

Denote $G_1$ and $G_2$ as two group droppings (also referred to as group dropping sets), such that $G_1$ and $G_2$ each include a consecutive set of dropped pictures.

If $G_2$ is a subset of $G_1$, such that $G_1$ includes all of the dropped pictures of $G_2$, then pooling($G_1$)>pooling($G_2$).

2. Suppression—

We note that human viewers typically quickly adjust their judgment rules by their experience from the prior moment. Therefore, a viewer's "dislike" mood will typically be slightly lower when the viewer sees a similar distortion more than one time. That is, after a viewer sees a distortion, when the viewer sees another occurrence of the same or a similar distortion, the viewer does not perceive the additional occurrence as being as large a distortion as the first occurrence.

Accordingly, if $G_1 \cap G_2 = \emptyset$, such that the two group droppings are completely disjoint, then pooling$(G_1 \cup G_2)$ < pooling$(G_1)$ + pooling$(G_2)$.

One function that satisfies the above two requirements or constraints is the square root function. Accordingly, in at least one implementation, the square root function is used as a pooling function. One such implementation uses the following pooling function:

$$D(G) = \sqrt{\frac{\sum_{g \in G} D(g)}{N}} \quad (4)$$

$$Q(G) = 5 - D(G)$$

G is the set of group droppings that has occurred in the distorted video.

N is a constant, typically selected as a large constant to normalize the value of D(G) to a suitable range. For example, in various implementations, N is selected so that the value of D(G) is within a range of [0, 4], which is the same range as D(g). In at least one implementation, N is set to be the number of pictures in the video window size.

Note that the pooled distortion value is not, in general, a value that can be compared to non-pooled distortion values for individual group droppings. This results from the fact that, in certain implementations, the pooled value is normalized to be within the same range (for example, [0, 4]) as the non-pooled values. In such situations, however, pooled values of distortion for different windows, for example, can be compared.

As a simple example of the application of equation (4), consider the following. Assume that:
  $G_1$ and $G_2$ are disjoint (that is, $G_1 \cap G_2 = \emptyset$).
  $G_{1,2} = G_1 \cup G_2$.
  $D(G_1) = 2$, and $D(G_2) = 3$.
Applying equation (4) yields:
  pooling$(G_1)$=sqrt(2/N)
  pooling$(G_2)$=sqrt(3/N)
  pooling$(G_{1,2})$=sqrt((2+3)/N)
It can be seen that:
  sqrt(5/N)>sqrt(2/N) and sqrt(5/N)>sqrt(3/N), thus pooling $(G_{1,2})$>pooling$(G_1)$, and pooling$(G_{1,2})$>pooling$(G_2)$, and the monotone requirement is met.
  sqrt(5/N)<sqrt(2/N)+sqrt(3/N), thus pooling$(G_1 \cup G_2)$ < pooling$(G_1)$+pooling$(G_2)$, and the suppression requirement is met.

Referring again to equations (1) to (4), various implementations modify one or more of the parameters of those equations. For example, in one or more implementations:
  len is expressed in units other than time, such as, for example, the number of consecutive pictures in the group dropping.
  mv is calculated by another approach, rather than the average motion vector of a preceding non-dropped picture. For example, in one or more implementations, a mode or median is used rather than an average, the average is a weighted average, only motion vectors of foreground objects are considered, and/or the largest motion vectors are given more weight (a weighted average). More generally, a variety of different filtering algorithms are used in different implementations.
  c is a more complicated variable in various implementations, varying based on, for example, the value of len and/or mv. Further, in some implementations, c varies based on different human characteristics (such as, for example, particular sensitivities to specific distortions), or based on different characteristics of the database of videos being analyzed (such as, for example, the type of content or the resolution).
  f is selected as a different function, involving, for example, exponential values and/or logarithms.
  N has a value of 1, and/or a value designed to bring the pooling result of equation (4) into a range that is different from [0, 4].
  D(G) from equation (4) uses a function different from the square root function, such as, for example, a cube root or other exponential function, and/or a logarithmic function.
  the ranges of the various variables is modified in other implementations.

2.3 Experimental Results

Equation (3) estimates the distortion and/or quality level generated by a group dropping, and equation (4) estimates the overall distortion and/or quality level of all or part of a distorted video that contains a set of group droppings. Various experiments were performed to assess the accuracy of at least one implementation.

In the experiments, the constant c was set to a value of 2.5, and the constant N was set to a value equal to the number of pictures in the video window size, which was 300. The value of c was iterated through the set of {0, 0.5, 1, 1.5, 2, 2.5, 3, 3.5, and 4}, and the value of 2.5 was determined to have good performance.

The proposed method of equations (1)-(4) was applied to four P.NBAMS training databases, that collectively include approximately 200 video sequences that are each approximately ten seconds long, to produce resulting distortion values. The prediction accuracy resulting from the application of the implementation to the training video sequences was compared with subjective scores. The subjective scores of approximately 20 people are averaged to form a "mean opinion scores" (MOS). The subjective scores, and the MOS, have a value between 1 (worst quality) and 5 (best quality). The P.NBAMS databases provide the MOS for each video sequence.

The comparison used was a correlation. A correlation was performed between the distortion results from the implementation and the MOS for each video sequence. The correlation was performed on each P.NBAMS database, and the correlation results for the databases revealed that the implementation had a prediction accuracy of between 0.75 and 0.78 for the training databases.

In another implementation, the value of N is increased, for example, to two times the window size (for example, to 600). This changes the pooled distortion values. However, this does not typically affect the overall accuracy of the resulting pooled distortion values because all resulting distortion values are generated with the same value of N. Additionally, in comparing the estimated distortion values with the MOS values, there is typically a fitting process that removes the influence of an increased value of N. The fitting process applies a pre-defined function $f_{fit}$. The function $f_{fit}$ is pre-defined by the creator of the "objective scores", which are the estimated values. The fitting process applies $f_{fit}$ to the "objective scores" to modify the values to $f_{fit}$(objective score). The modified values are then used to calculate a correlation with the MOS values (the "subjective scores"). Thus, the fitting function can, typically be pre-defined to remove the influence of a scaled N.

Implementations related to equation (1), or variations thereof, can be applied to a variety of contexts and applications. Various such implementations are applied to video sequences exhibiting "freeze with skip" distortion causes, or "freeze without skip" distortion causes, or both. One or more such implementations use the "mv×c" term of equation (1) to capture distortion or quality associated with a "jerky" (or "jerk") effect and/or a "jumping" (or "jump") effect.

A "jerky" effect is related to the jerk, or stop, in motion that occurs when a picture is initially repeated (that is, when a freeze first occurs). A jerk occurs with a freeze, and so is seen with both a "freeze with skip" and a "freeze without skip". The jerky effect arises because the human brain attempts to follow a moving trajectory of a sequence of pictures. However, the sequence of pictures freezes, and the trajectory is artificially and unexpectedly stopped. This unexpected stop is referred to as a jerk in motion, and the human brain expends energy noticing and processing the jerk in motion. The expenditure of energy and the associated processing typically registers as an undesirable aspect of viewing a sequence of pictures. Accordingly, a jerk in motion is considered to be a distortion and to decrease the quality of the sequence of pictures.

A "jumping" effect is related to the jump in motion that occurs when the content of a picture jumps to a different position in an immediately subsequent picture. This occurs, for example, during a "skip" when the picture after the freeze is displayed. Typically, the dropped pictures exhibit motion with respect to the previously displayed picture (the picture prior to the frozen picture) and with respect to each other. Thus, if no pictures were dropped, there would be a motion trajectory across the dropped pictures to the picture occurring after the dropped pictures. However, when a freeze occurs, the picture immediately following the dropped pictures will exhibit the cumulative motion from all of the dropped pictures. This cumulative motion will typically be experienced as a jump in motion.

The mv term of equation (1) is determined, in various implementations, from one or more motion vectors of the picture before the dropped pictures, or from one or more motion vectors of the picture after the dropped pictures, or from a combination of motion vectors of the pictures before and after the dropped pictures. In certain implementations:

mv is based on motion vectors of the picture before the dropped pictures, and the mv×c term models the distortion of a jerky effect;

mv is based on motion vectors of the picture before the dropped pictures, and the mv×c term models the distortion of a jumping effect;

mv is based on motion vectors of the picture before the dropped pictures, and the mv×c term models the combined distortion of both a jerky effect and a jumping effect;

mv is based on motion vectors of the picture after the dropped pictures, and the mv×c term models the distortion of a jumping effect.

The variable c, in the equation (1) term mv×c, is selected in various implementations based on whether the mv×c term is modeling a jerky effect, a jumping effect, or a combination of a jerky effect and a jumping effect. For example, if both a jerky effect and a jumping effect are being modeled by a single mv×c term, then c is larger, in certain implementations, than if only a single distortion were being modeled. Additionally, certain implementations use two mv×c terms, added together, to model multiple distortions.

Certain implementations choose to calculate distortion, or quality, by focusing on one or more distortion effects and by ignoring one or more other distortion effects. For example, various implementations of equation (1) use the mv×c term to model only jumping effects and ignore any distortion arising from jerky effects. As another example, various implementations of equation (1) use the mv×c term to model only jerky effects and ignore any distortion arising from jumping effects.

Figure 7:
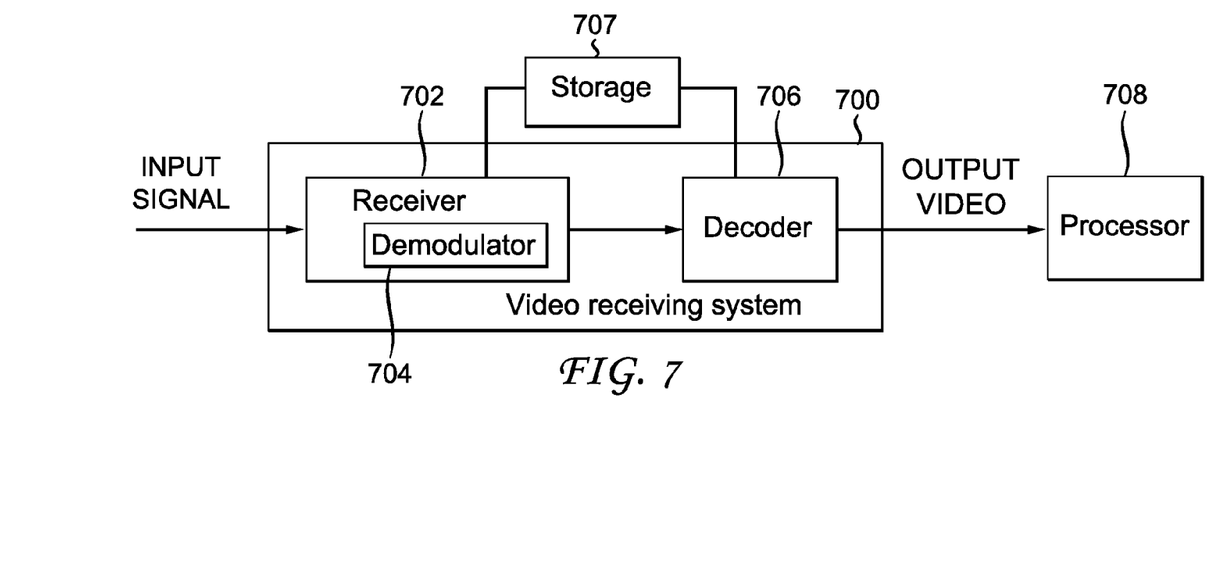
FIG. 7 is a block/flow diagram depicting an example of a receiving system and process that may be used with one or more implementations.

FIGS. 6 and 7 provide additional context that is applicable to at least one implementation. Referring to FIG. 6, a video transmission system or apparatus 600 is shown, to which the features and principles described in this application may be applied. The video transmission system or apparatus 600 may be, for example, a head-end or transmission system for transmitting a signal using any of a variety of media, such as, for example, satellite, cable, telephone-line, or terrestrial broadcast. The video transmission system or apparatus 600 also, or alternatively, may be used, for example, to provide a signal for storage. The transmission may be provided over the Internet or some other network. The video transmission system or apparatus 600 is capable of generating and delivering, for example, video content and other content such as, for example, indicators of depth including, for example, depth and/or disparity values. It should also be clear that the blocks of FIG. 6 provide a flow diagram of a video transmission process, in addition to providing a block diagram of a video transmission system or apparatus.

The video transmission system or apparatus 600 receives input video from a processor 601. In one implementation, the processor 601 simply provides video pictures, such as the pictures of the video sequence 100 of FIG. 1, to the video transmission system or apparatus 600. However, in another implementation, the processor 601 alternatively, or additionally, provides depth pictures or other content to the video transmission system or apparatus 600. The processor 601 may also provide metadata to the video transmission system or apparatus 600, in which the metadata relates to one or more of the input pictures.

The video transmission system or apparatus 600 includes an encoder 602 and a transmitter 604 capable of transmitting the encoded signal. The encoder 602 receives video information from the processor 601. The video information may include, for example, video pictures, and/or disparity (or depth) pictures. The encoder 602 generates an encoded signal(s) based on the video and/or disparity information.

In various implementations, the encoder 602 is, for example, an AVC encoder. The AVC encoder may be applied to both video and disparity information. AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard", the "H.264 standard", or simply "AVC" or "H.264").

The encoder 602 may include sub-modules, including for example an assembly unit for receiving and assembling various pieces of information into a structured format for storage or transmission. The various pieces of information may include, for example, encoded or unencoded video, encoded or unencoded disparity (or depth) values, and encoded or unencoded elements such as, for example, motion vectors, coding mode indicators, and syntax elements. In some implementations, the encoder 602 includes the processor 601 and therefore performs the operations of the processor 601.

The transmitter 604 receives the encoded signal(s) from the encoder 602 and transmits the encoded signal(s) in one or more output signals. The transmitter 604 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 606. The transmitter 604 may include, or interface with, an antenna (not shown). Further, implementations of the transmitter 604 may be limited to the modulator 606.

The video transmission system or apparatus 600 is also communicatively coupled to a storage unit 608. In one implementation, the storage unit 608 is coupled to the encoder 602, and the storage unit 608 stores an encoded bitstream from the encoder 602 and, optionally, provides the stored bitstream to the transmitter 604. In another implementation, the storage unit 608 is coupled to the transmitter 604, and stores a bitstream from the transmitter 604. The bitstream from the transmitter 604 may include, for example, one or more encoded bitstreams that have been further processed by the transmitter 604. The storage unit 608 is, in different implementations, one or more of a standard DVD, a Blu-Ray disc, a hard drive, or some other storage device.

Referring now to FIG. 7, a video receiving system or apparatus 700 is shown to which the features and principles described above may be applied. The video receiving system or apparatus 700 may be configured to receive signals over a variety of media, such as, for example, satellite, cable, telephone-line, or terrestrial broadcast. The signals may be received over the Internet or some other network. It should also be clear that the blocks of FIG. 7 provide a flow diagram of a video receiving process, in addition to providing a block diagram of a video receiving system or apparatus.

The video receiving system or apparatus 700 may be, for example, a cell-phone, a computer, a tablet, a set-top box, a television, a gateway, a router, or other device that receives encoded video and provides, for example, decoded video signal for display (display to a user, for example), for processing, or for storage. Thus, the video receiving system or apparatus 700 may provide its output to, for example, a screen of a television, a computer monitor, a computer (for storage, processing, or display), a tablet, or some other storage, processing, or display device.

The video receiving system or apparatus 700 is capable of receiving and processing video information, and the video information may include, for example, video pictures, and/or disparity (or depth) pictures. The video receiving system or apparatus 700 includes a receiver 702 for receiving an encoded signal, such as, for example, the signals described in the implementations of this application. The receiver 702 may receive, for example, a signal providing one or more of the pictures of the video sequence 100 of FIG. 1, or a signal output from the video transmission system 600 (for example, from the storage unit 608 or the transmitter 604) of FIG. 6.

The receiver 702 may be, for example, adapted to receive a program signal having a plurality of bitstreams representing encoded pictures (for example, video pictures or depth pictures). Typical receivers perform functions such as, for example, one or more of receiving a modulated and encoded data signal, demodulating the data signal from one or more carriers using a demodulator 704, de-randomizing the energy in the signal, de-interleaving the data in the signal, and error-correction decoding the signal. The receiver 702 may include, or interface with, an antenna (not shown). Implementations of the receiver 702 may be limited to the demodulator 704.

The video receiving system or apparatus 700 includes a decoder 706. The receiver 702 provides a received signal to the decoder 706. The signal provided to the decoder 706 by the receiver 702 may include one or more encoded bitstreams. The decoder 706 outputs a decoded signal, such as, for example, decoded video signals including video information, or decoded depth signals including depth information. The decoder 706 may be, for example, an AVC decoder.

The video receiving system or apparatus 700 is also communicatively coupled to a storage unit 707. In one implementation, the storage unit 707 is coupled to the receiver 702, and the receiver 702 accesses a bitstream from the storage unit 707 and/or stores a received bitstream to the storage unit 707. In another implementation, the storage unit 707 is coupled to the decoder 706, and the decoder 706 accesses a bitstream from the storage unit 707 and/or stores a decoded bitstream to the storage unit 707. The bitstream accessed from the storage unit 707 includes, in different implementations, one or more encoded bitstreams. The storage unit 707 is, in different implementations, one or more of a standard DVD, a Blu-Ray disc, a hard drive, or some other storage device.

The output video from the decoder 706 is provided, in one implementation, to a processor 708. The processor 708 is, in one implementation, a processor configured for rendering new views. In some implementations, the decoder 706 includes the processor 708 and therefore performs the operations of the processor 708. In other implementations, the processor 708 is part of a downstream device such as, for example, a set-top box, a tablet, or a television. More generally, the processor 708 and/or the video receiving system or apparatus 700 are, in various implementations, part of a gateway, a router, a set-top box, a tablet, a television, or a computer.

Various implementations of the video receiving system or apparatus 700 and/or the processor 708 evaluate distortion and/or quality of a video sequence that includes one or more group droppings caused by "freezing with skip". The distortion and/or quality of the group droppings can be determined as described in this application (using, for example, equations (1)-(4) and/or the methods described in FIG. 8 or 9). Such implementations are performed at, for example, the receiver 702, the demodulator 704, the decoder 706, and/or the processor 708.

Figure 8:
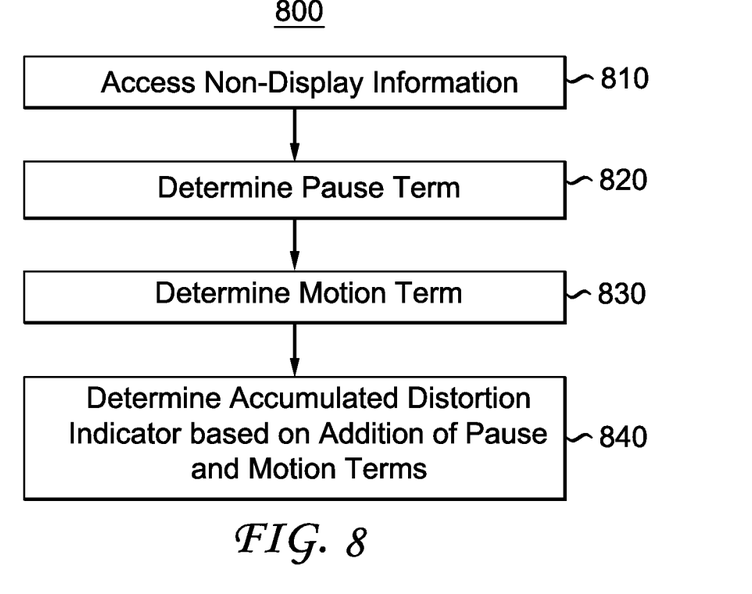
FIG. 8 is a block/flow diagram depicting a first implementation of an apparatus and method for combining distortion.

Referring to FIG. 8, a method 800 is shown for determining an accumulated indicator of distortion. The accumulated indicator of distortion is, for example, in various implementations, a value for distortion of one or more group droppings, or a value for quality of one or more group droppings.

The method 800 includes accessing non-display information (810). The non-display information is, in at least one implementation, information indicating that one or more consecutive pictures from a video sequence are not to be displayed. In particular implementations, the accessed information includes, for example, an indicator of a packet loss from a picture in the video sequence, or an indicator of a dropped picture from a picture in the video sequence. Other implementations, the accessed information is, for example, an indicator of an uncorrectable error in a picture in the video sequence.

The method 800 includes determining a pause term (820). In at least one implementation, performing the operation 820 includes determining a pause term indicating an amount of distortion associated with a pause arising from not displaying one or more consecutive pictures that are not to be displayed.

In another implementation, performing the operation 820 includes determining a pause term that indicates distortion associated with a duration of displaying substantially a common picture during a display time for the one or more consecutive pictures that are not to be displayed. Displaying substantially a common picture during the display time includes displaying substantially the same (that is, a common) picture during the entire display time. Thus, this includes displaying a last decoded picture during a freeze. However, this also includes displaying pictures during the freeze that change slightly but are still substantially the same. One such change is, for example, adding a count to the last decoded picture that increments with each picture display time during the freeze. The duration is measured, in various implementations, by either a length of time for displaying the one or more consecutive pictures, or by a number indicating the number of dropped pictures.

The method 800 includes determining a motion term (830). In at least one implementation, performing the operation 830 includes determining a motion term indicating an amount of distortion associated with a change in motion arising from not displaying one or more consecutive pictures that are not to be displayed.

In another implementation, performing the operation 830 includes determining a motion term indicating distortion associated with a change in motion arising from displaying substantially the common picture during the display time for the one or more consecutive pictures that are not to be displayed. In one implementation, the change in motion is a jump in motion, and the pause term indicates distortion arising from the jump in motion occurring from displaying another picture from the video sequence as the next picture displayed after displaying the substantially common picture. In another implementation, the change in motion is a stop in motion, and the pause term indicates distortion arising from the stop in motion occurring from displaying the substantially common picture during the display time rather than displaying the one or more consecutive pictures that are not to be displayed.

The method 800 includes determining an accumulated distortion indicator based on the addition of the pause term and the motion term (840). In one implementation, the pause term is Wen, c+1, 5), the motion term is $-mv \times c$, and the accumulated distortion indicator is the sum as shown in equation (1).

Figure 9:
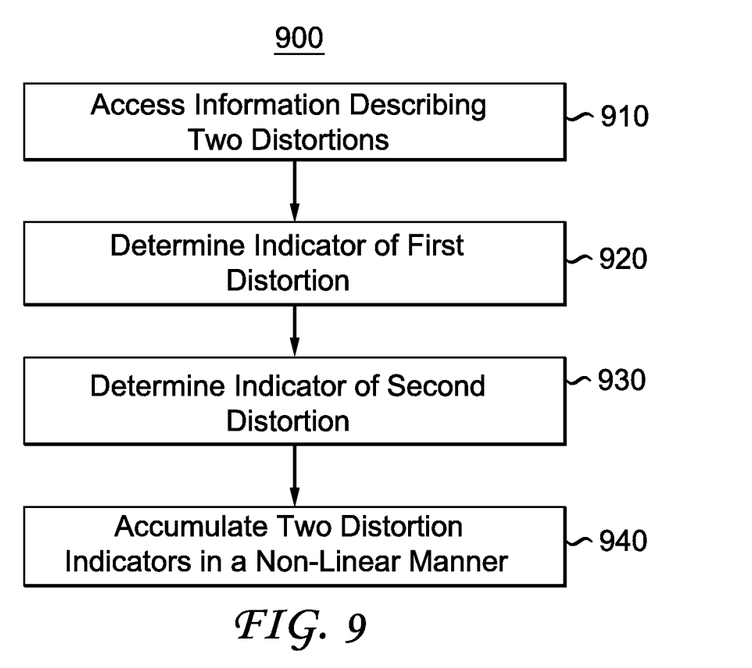
FIG. 9 is a block/flow diagram depicting a second implementation of an apparatus and method for combining distortion.

Referring to FIG. 9, a method 900 is shown for determining an accumulated indicator of distortion. The accumulated indicator of distortion is, for example, in various implementations, a value for distortion of one or more group droppings, or a value for quality of one or more group droppings.

The method 900 includes accessing information describing two distortions (910). The accessed information describes, in at least one implementation, a first occurrence of distortion and a second occurrence of distortion in a video sequence that includes multiple pictures.

The method 900 includes determining an indicator of a first distortion (920). In at least one implementation, the indicator is a first indicator of a first occurrence of distortion.

In at least one implementation, determining an indicator of a first distortion includes determining a first indicator, the first indicator indicating an amount of distortion across one or more types of distortive effects that results from displaying a video sequence without displaying a first set of pictures. In another implementation, determining an indicator of a first distortion includes determining a first indicator, the first indicator indicating an amount of distortion across the one or more types of distortive effects that results from displaying the video sequence with substantially a first common picture displayed during a display time for the first set of pictures.

The method 900 includes determining an indicator of a second distortion (930). In at least one implementation, the indicator is a second indicator of a second occurrence of distortion.

In at least one implementation, determining an indicator of a second distortion includes determining a second indicator, the second indicator indicating an amount of distortion across one or more types of distortive effects that results from displaying a video sequence without displaying a second set of pictures. In another implementation, determining an indicator of a first distortion includes determining a first indicator, the first indicator indicating an amount of distortion across the one or more types of distortive effects that results from displaying the video sequence with substantially a second common picture displayed during a display time for the second set of pictures.

The method 900 includes accumulating the two distortion indicators in a non-linear manner (940). In at least one implementation, performing the operation 940 includes accumulating the first indicator and the second indicator in a non-linear manner to produce a combined indicator of distortion.

The methods 800 and 900, as well as other implementations described in this application can be performed at a variety of points in a communications system. As discussed above with respect to FIGS. 6-7, determinations of distortion and/or quality are performed, in various implementations, at the decoding/reception/display end of a communication system. Such determinations are, in various implementations, part of a Quality of Experience ("QoE") evaluation. The QoE evaluation is, in various implementations, envisioned to be performed according to a standardized algorithm. The standardized algorithm may be one or more (or a variation of one or more) of the described implementations for evaluating distortion and/or quality.

This application provides multiple block/flow diagrams, including the block/flow diagrams of FIGS. 6-9. It should be clear that the block/flow diagrams of this application present a variety of information, including, for example, a flow diagram describing a process, and a block diagram describing functional blocks of an apparatus. Additionally, this application provides multiple pictorial representations, including the pictorial representations of FIGS. 1-2. It should be clear that the pictorial representations of this application present a variety of information, including, for example, an illustration of a result or output, and a flow diagram describing a process. Additionally, this application provides multiple graphical representations, including the graphical representations of FIGS. 3-5. It should be clear that the graphical representations of this application present a variety of information, including, for example, an illustration of a result or output for a function at various input values, and an indication of relationships among variables.

Various implementations have been described that determine distortion and/or quality of a group dropping that results in a "freeze with skip". These implementations are extended, in various other implementations, to apply to distortions other than group droppings that result in a "freeze with skip". In particular, the techniques and implementations of this application apply, in various implementations, to distortion resulting only from a freeze, to distortion resulting only from a skip, or to other distortions. Indeed, the pooling techniques described, such as, for example, equation (4), apply in various other implementations to pooling any distortion values, and are not restricted to freezes and/or skips.

Various implementations have been described that apply to video sequences. These implementations are extended, in various other implementations, to apply to other content. Such other content includes, for example, content other than standard two-dimensional video content. Non-video content includes, for example, depth maps, edge maps, transparency maps, ultra-violet or infra-red frequency images, heat signatures from night-vision goggles, scientific data intended to be analyzed on a display, or any data having a repeating pattern or intended to be viewed in a sequential manner.

Various implementations have been described that determine distortion and/or quality of a group dropping that includes one or more dropped pictures. These implementations do not depend on any particular technique for determining when a picture is to be dropped. Implementations need not even include the determination of whether or not a picture is dropped, because the indication that a picture is (or is not) dropped is an input to these implementations. Consequently, the determination to drop a picture may be made in various ways, as is known in the art, and may include, for example, dropping a picture if a single packet of the picture is lost, or dropping a picture only if all packets of the picture are lost and if suitable concealment techniques are not available.

Various implementations have been described that determine distortion and/or quality of a group dropping that includes one or more dropped pictures that result in a "freeze with skip". These implementations are extended in various other implementations to apply to situations in which the "freeze" does not involve repeating the same exact picture during the display time for each dropped picture. For example, in one implementation, a small counter is included in the bottom right of the displayed picture indicating the number of times that the picture has been repeated. Thus, if four pictures were dropped, the "frozen" picture that is displayed for five display times (including the one expected display time, and the four "frozen" display times) would be identical except that a small counter would appear in the bottom right during the four display times for the dropped pictures. This small counter would increment from one, to two, to three, to four, in these four display times.

We have described implementations that drop a picture when a single packet is lost. The picture is dropped due to a single packet loss, in certain implementations, because, for example, (i) in low resolution videos, the whole picture is often in a single packet, or (ii) certain applications have a requirement that there be no concealment artifacts and thus error concealment is not used. Implementations vary in the determination of when to drop a picture (for example, dropping if only a single packet is lost, or requiring more packets to be lost, etc.). However, when the picture is dropped, the freezing with skip distortion occurs. Other applications do attempt error concealment if a single packet is lost. Certain implementations also drop all further pictures that depend on a dropped picture, even if only a single macroblock of one of the further pictures uses the dropped picture as a reference. Such implementations drop these dependent pictures because, for example, (i) there is requirement for no concealment artifacts, (ii) the entire further picture is in a single packet and it is efficient to avoid decoding the packet, or (iii) quality is more assured in this manner because even a single lost macroblock in a dependent picture may have critical content (for example, an object) for viewer satisfaction. Additionally, other implementations vary in the determination of when to drop a subsequent picture that depends from a dropped picture, requiring, for example, a threshold number of macroblocks of the subsequent picture to be affected, or error concealment artifacts to be above a threshold. Note that dropping a picture is also considered, in various implementations, to be a form of error concealment.

We described above at least one implementation that uses equation (4) for a pooling function. Other pooling functions are possible. Various other implementations use a wrap function for pooling, as follows:

$$D(G) = \frac{\sqrt{\sum_{g \in G} D(g)}}{C1}, \text{ if } D(G) \le C2 \qquad (5)$$
$$D(G) = C2, \qquad \text{otherwise}$$

The above wrap function uses two constant numbers, which are C1 and C2. Both C1 and C2 are determined by experiment in various implementations.

Various implementations may have one or more of a variety of advantages. A partial list of these advantages includes: (i) low complexity, (ii) separation of "freeze" and "skip" distortions in the distortion model, (iii) allowing accurate determination of distortion arising from, for example, freezes, skips, or freeze with skip, (iv) allowing encoding, modulation, and transmission parameters to be determined to provide desired quality levels, and/or (v) pooling distortion/quality values, for multiple occurrences of distortion, in an accurate manner.

We thus provide one or more implementations having particular features and aspects. In particular, we provide several implementations relating to determining distortion and/or quality. However, variations of these implementations and additional applications are contemplated and within our disclosure, and features and aspects of described implementations may be adapted for other implementations.

Several of the implementations and features described in this application may be used in the context of the AVC Standard, and/or AVC with the MVC extension (Annex H), and/or AVC with the SVC extension (Annex G). Additionally, these implementations and features may be used in the context of another standard (existing or future), or in a context that does not involve a standard.

It should be clear that a distortion term or a quality term typically indicates both distortion and quality. Thus, for example, referring to equation (1), each of $Q(g)$, $D(g)$, $f(\text{len}, c+1, 5)$, and "mv×c" indicate both distortion and quality.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, evaluating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, evaluating the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Various implementations refer to "combining", such as, for example, in combining distortion or quality, or combining indicators of distortion or quality. "Combining" is also referred to as accumulating or, in various implementations, pooling. "Combining" is performed, in various implementations, using one or more of, for example, addition operations, multiplication operations, exponential operations, operations that select a minimum, or operations that select a maximum. Additionally, many implementations may be implemented in one or more of an encoder (for example, the encoder 602), a decoder (for example, the decoder 706), a post-processor (for example, the processor 708) processing output from a decoder, or a pre-processor (for example, the processor 601) providing input to an encoder. The processors discussed in this application do, in various implementations, include multiple processors (sub-processors) that are collectively configured to perform, for example, a process, a function, or an operation. For example, the processor 601 and the processor 708 are each, in various implementations, composed of multiple sub-processors that are collectively configured to perform the operations of the respective processors 601 and 708. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a set-top box, a gateway, a router, a microprocessor, an integrated circuit, or a programmable logic device. Processors also include communication devices, such as, for example, computers, cell phones, portable/personal digital assistants ("PDAs"), tablets, laptops, and other devices that facilitate communication of information between end-users. A processor may also include multiple processors that are collectively configured to perform, for example, a process, a function, or an operation. The collective configuration and performance may be achieved using any of a variety of techniques known in the art, such as, for example, use of dedicated sub-processors for particular tasks, or use of parallel processing.

Implementations of the various processes and features described herein may be embodied in a variety of different equipment or applications, particularly, for example, equipment or applications associated with data encoding, data decoding, view generation, depth or disparity processing, and other processing of pictures and related depth and/or disparity maps. Examples of such equipment include an encoder, a decoder, a post-processor processing output from a decoder, a pre-processor providing input to an encoder, a video coder, a video decoder, a video codec, a web server, a set-top box, a, a laptop, a personal computer, a tablet, a cell phone, a PDA, and other communication devices. As should be clear, the equipment may be mobile and even installed in a mobile vehicle.

Additionally, the methods may be implemented by instructions being performed by a processor (or by multiple processors collectively configured to perform such instructions), and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a "DVD", often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a standard, or to carry as data the actual syntax-values written for a standard. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
accessing information indicating that one or more consecutive pictures from a video sequence are not to be displayed;
determining a pause term indicating an amount of distortion associated with a pause arising from not displaying the one or more consecutive pictures that are not to be displayed;
determining a motion term indicating an amount of distortion associated with a change in motion arising from not displaying the one or more consecutive pictures that are not to be displayed, wherein the change in motion is one of a jump in motion and a stop in motion the motion term indicating an amount of distortion arising from the jump in motion occurring from displaying another picture from the video sequence as the next picture displayed after displaying the substantially common picture when the change in motion is the jump in motion, and the motion term indicating an amount of distortion arising from the stop in motion occurring from displaying the substantially common picture during the display time rather than displaying the one or more consecutive pictures that are not to be displayed if the motion is the stop in motion; and
determining a combined indicator of an amount of distortion based on an addition of the pause term and the motion term.

2. The method of claim 1 wherein:
the amount of distortion indicated by the pause term is associated with a duration of displaying substantially a common picture during a display time for the one or more consecutive pictures that are not to be displayed, and
the amount of distortion indicated by the motion term is associated with the change in motion arising from displaying substantially the common picture during the display time for the one or more consecutive pictures that are not to be displayed.

3. The method of claim 1 wherein:
the pause term increases monotonically with the number of consecutive pictures that are not to be displayed.

4. The method of claim 3 wherein:
an incremental increase in the pause term decreases as the number of consecutive dropped pictures increases.

5. The method of claim 1 wherein:
determining the motion term comprises calculating the motion term based on a motion value indicating motion for the one or more consecutive pictures.

6. The method of claim 5 wherein:
the motion term increases monotonically with increased indicated motion.

7. The method of claim 6 wherein:
the motion term increases linearly with increased indicated motion.

8. The method of claim 5 wherein:
the motion value is derived from one or more motion vectors for a picture occurring before the one or more consecutive pictures in the video sequence.

9. The method of claim 5 wherein:
the motion value is derived from one or more motion vectors for a picture occurring after the one or more consecutive pictures in the video sequence.

10. The method of claim 5 wherein:
the motion value is derived from both (i) one or more motion vectors for a picture occurring before the one or more consecutive pictures in the video sequence and (ii) one or more motion vectors for a picture occurring after the one or more consecutive pictures in the video sequence.

11. An apparatus comprising:
a decoder configured to access information indicating that one or more consecutive pictures from a video sequence are not to be displayed; and
a processor configured to
determine a pause term indicating an amount of distortion associated with a pause arising from not displaying the one or more consecutive pictures that are not to be displayed,
determine a motion term indicating an amount of distortion associated with a change in motion arising from not displaying the one or more consecutive pictures that are not to be displayed, wherein the change in motion is one of a jump in motion and a stop in motion, the motion term indicating an amount of distortion arising from the jump in motion occurring from displaying another picture from the video sequence as the next picture displayed after displaying the substantially common picture when the change in motion is the jump in motion, and the motion term indicating an amount of distortion arising from the stop in motion occurring from displaying the substantially common picture during the display time rather than displaying the one or more consecutive pictures that are not to be displayed if the motion is the stop in motion, and
determine a combined indicator of an amount of distortion based on an addition of the pause term and the motion term.

12. The apparatus of claim 11, wherein:
the amount of distortion indicated by the pause term is associated with a duration of displaying substantially a common picture during a display time for the one or more consecutive pictures that are not to be displayed, and the amount of distortion indicated by the motion term is associated with the change in motion arising from displaying substantially the common picture during the display time for the one or more consecutive pictures that are not to be displayed.

13. The apparatus of claim 11, wherein the pause term increases monotonically with the number of consecutive pictures that are not to be displayed.

14. The apparatus of claim 13, wherein an incremental increase in the pause term decreases as the number of consecutive dropped pictures increases.

15. The apparatus of claim 11, wherein the processor determines the motion term responsive to motion value indicating motion for the one or more consecutive pictures.

16. The apparatus of claim 15, wherein the motion term increases monotonically with increased indicated motion.

17. The apparatus of claim 16, wherein the motion term increases linearly with increased indicated motion.

18. The apparatus of claim 15, wherein the motion value is derived from one or more motion vectors for a picture occurring before the one or more consecutive pictures in the video sequence.

19. The apparatus of claim 15, wherein the motion value is derived from one or more motion vectors for a picture occurring after the one or more consecutive pictures in the video sequence.

20. The apparatus of claim 15, wherein the motion value is derived from both (i) one or more motion vectors for a picture occurring before the one or more consecutive pictures in the video sequence and (ii) one or more motion vectors for a picture occurring after the one or more consecutive pictures in the video sequence.

* * * * *